United States Patent [19]

Schmid

[11] Patent Number: 4,945,945
[45] Date of Patent: Aug. 7, 1990

[54] CHECK VALVE ASSEMBLY FOR CORROSIVE FLUIDS

[75] Inventor: Carl E. Schmid, Easton, Conn.

[73] Assignee: The Perkin-Elmer Corp., Norwalk, Conn.

[21] Appl. No.: 443,997

[22] Filed: Nov. 30, 1989

[51] Int. Cl.$^5$ .............................................. F16K 15/04
[52] U.S. Cl. ................................ 137/512; 137/533.13; 137/533.15; 251/368
[58] Field of Search .............. 137/512, 533.15, 533.13, 137/519.5; 251/368

[56] References Cited

U.S. PATENT DOCUMENTS

| | | | |
|---|---|---|---|
| 3,661,167 | 5/1972 | Hussey | 137/512 X |
| 4,139,469 | 2/1979 | Rainin | 137/512 X |
| 4,862,907 | 9/1989 | Ledtje | 137/512 X |

Primary Examiner—Robert G. Nilson
Attorney, Agent, or Firm—H. S. Ingham; E. T. Grimes

[57] ABSTRACT

A high pressure check valve assembly includes a ceramic cage loosely fitted into the bore of a body so as to leave at least a partial clearance between the cage and the body. A passage through the cage includes a retaining section adjacent a fluid inlet end for loosely containing a ball and an irregular cross-section adjacent the retaining section so as to obstruct the ball without hindering fluid flow forwardly through the passage. The cage further has a lateral bleed hole between the passage and the clearance to equalize fluid pressure. An outlet-end sealing member is press fitted into the bore against the outlet end of the cage. An oversized resilient washer-shaped inlet-end sealing member is press fitted into the bore against the inlet end of the cage to seal and retain the assembly. This member has a central aperture with a washer shaped seat member fitted therein, the seat member functioning with the ball as the check valve.

16 Claims, 2 Drawing Sheets

CHECK VALVE ASSEMBLY FOR CORROSIVE FLUIDS

This invention relates to check valves and particularly to a check valve assembly useful for corrosive fluids.

BACKGROUND OF THE INVENTION

Check valves are quite common in fluid devices, such as in piston type pumps where back flow is to be checked during a return stroke. One type of valve is a ball valve comprising a ball that is held in a retaining device and is forced against a seat to close off flow when there is a back pressure. These are simple in concept but there are problems with components and construction of valves for some applications. One such problem area is in pumps for liquid chromatography, where there is a combination of requirements for small size, high pressure, corrosive liquids and low cost, with a well controlled ball travel to provide small reverse flow to seal the ball.

Objects of the invention are to provide an improved check valve assembly useful for high pressure corrosive fluids, to provide such a valve assembly that is small in size, to provide such a valve assembly that can withstand very high fluid pressure, to provide such a valve assembly having a relatively few number of parts, and to provide such a valve assembly at relatively low cost.

SUMMARY OF THE INVENTION

The foregoing and other objects are achieved by a check valve assembly comprising a body with a cylindrical bore there through and a ceramic cage loosely fitted into the bore so as to leave at least a partial clearance between the cage and the body. The cage has an inlet end, an outlet end and a passage therebetween receptive of fluid at the inlet end. The passage has a retaining section adjacent the inlet end for loosely containing a ball, and an irregular cross-section adjacent the retaining section so as to obstruct the ball without hindering fluid flow through the passage.

A washer-shaped seat member is affixed within the bore adjacent to and in sealed relationship with the inlet end, the seat member being cooperative with the ball to effect closure under fluid pressure from the outlet end. An inlet-end sealing means seals the inlet end of the cage to the body. An outlet-end sealing means seals the outlet end of the cage to the body. Fluid is introduced into the clearance so as to equalize fluid pressure between the passage and the clearance, advantageously by the cage having a lateral bleed hole therein between the passage and the clearance.

In a preferred embodiment the inlet-end sealing means comprises a resilient washer-shaped inlet-end sealing member press fitted into the bore against the inlet end of the cage. This sealing member has a central aperture with the seat member fitted therein to affix the seat member within the bore in the sealed relationship with the inlet end. The outlet-end sealing means comprises a resilient washer-shaped outlet-end sealing member press fitted into the bore against the outlet end of the cage.

PRIOR ART

Figure 1:
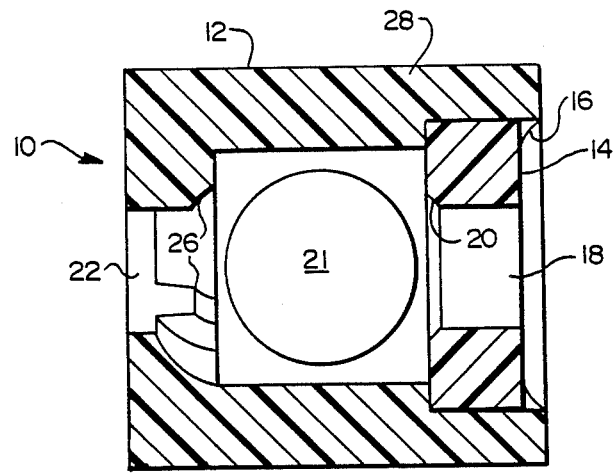
FIG. 1 is a longitudinal section of a prior art check valve..

A prior art valve 10 used for liquid chromatographic systems is illustrated in FIG. 1. This is formed of ceramic materials to withstand corrosion. A cage 12 has a seat 14 affixed therein by a glass seal joint 16. The seat has a hole 18 with a beveled edge 20 inside the cage to match with a ceramic ball 21. The ball forced against the seat seals against backpressure. Another hole 22 at the other end of the cage has ribs 26 extending radially therefrom to retain the ball but allow fluid flow through the cage. In order to function at very high fluid pressure the ceramic cage must have a relatively thick wall 28, resulting in excessive size and cost for some applications. There is no provision per se for mounting and sealing or otherwise interfacing this valve with a system.

Figure 2:
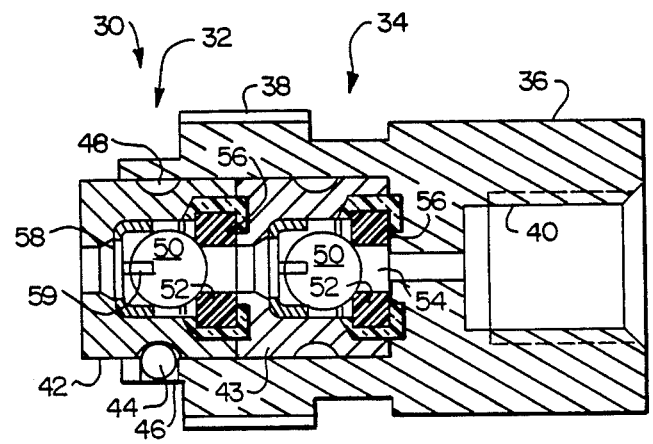
FIG. 2 is a longitudinal section of a prior art check valve assembly.

A prior art check valve assembly 30 of two valve subassemblies 32, 34 in tandem being used commercially by the assignee of the present invention for liquid chromatography pumps is shown in FIG. 2. A tubular metal body 36 has threading 38,40 for mounting and fluid connections (not shown). The body further has a pair of tubular metal (stainless steel or titanium) members 42,43 retained therein by a bead 44 pressed into place between a lateral hole 46 in the body and a circumferential slot 48 in the member. A ball 50 and a seat 52 are disposed in a central passage 54 of each member. The seats are held and sealed in the respective metal member by appropriately shaped resilient polytetrafluoroethylene cups 56, which also provide sealing between cages and to the body.

A spider 58 made of corrosion resistant metal such as titanium or stainless steel is used to keep each ball in place axially while allowing fluid flow around the ball. The spider is formed out of sheet metal as a ring with four legs 59 (three shown) bent to extend parallel to the axis. This spider is very small, e.g. about 3 mm diameter and, therefore, is difficult to form (especially of titanium), and it is fragile and susceptible to stress corrosion. More broadly this assembly is susceptible to corrosion and also has an undesirable number of parts, adding to cost and making it difficult to control ball travel.

DETAILED DESCRIPTION OF THE INVENTION

Figure 3:
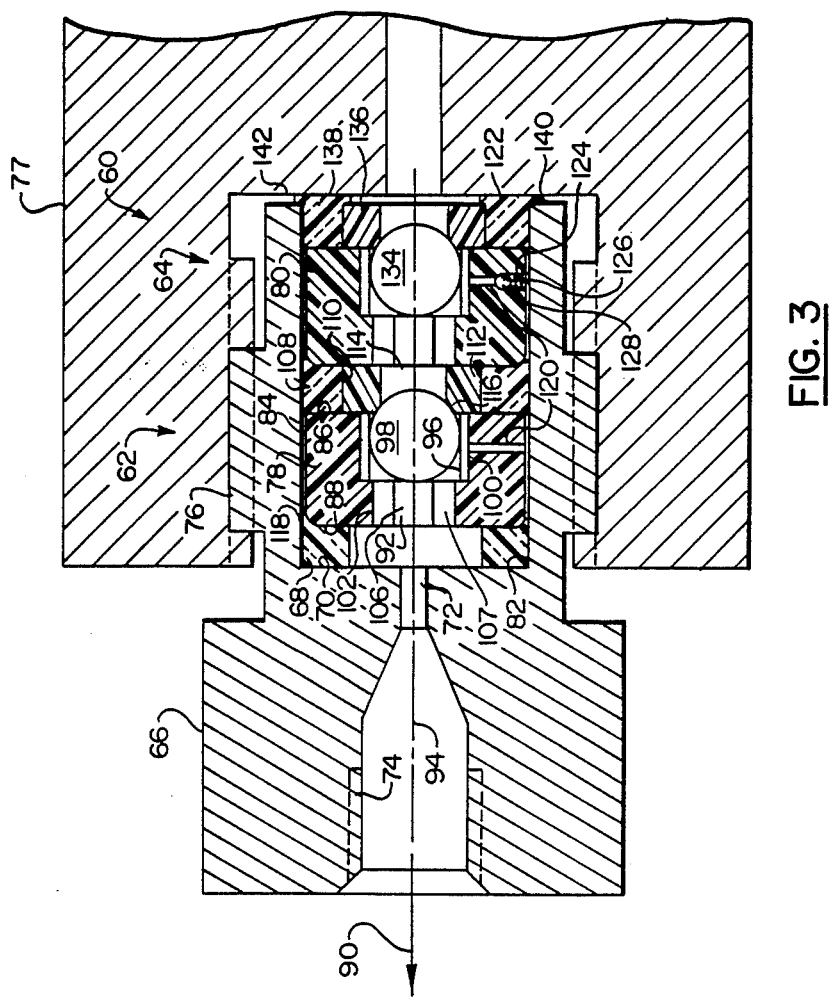
FIG. 3 is a longitudinal section of a check valve assembly according to the present invention.

FIG. 3 shows a preferred embodiment of a check valve assembly 60 according to the present invention, that is particularly suitable as a relatively small device for corrosive fluids. In this embodiment two subassemblies 62,64 of check valves are disposed in tandem in a body 66 although, more broadly, only one subassembly may be used, or even three or more.

The body 66 is formed of stainless steel, titanium or other metal selected for corrosion resistance to the fluid. The body has a cylindrical bore 68 therethrough with a shoulder 70 to a reduced diameter portion 72 of the bore. Internal threads 74 in the reduced diameter portion provide for connection to tubing (not shown) for the fluid. External threads 76 outside the body provide for connection to a mounting block 77 or the like for mounting and fluid flow continuity. Other connecting means may, of course, be utilized. The body 66 may have a hexagonal configuration (not shown) at a location 79 for wrenching the threads 76 into block 77.

First and second cages 78,80, substantially identical, are disposed in the larger diameter portion 82 of the bore. The cages are formed of ceramic, for example machinable or molded alumina to withstand the corrosiveness of the fluid. Further description below is detailed with respect to one cage 78, it to be understood that the second cage 80 (if any) and its associated components may be essentially the same at the first.

The cage 78 is fitted loosely into the bore 82, being formed so as to slide in for assembly. Such a sliding fit retains the cage but results in at least a partial, narrow clearance 84 of space between the cage and the body. (The clearance is enlarged in the drawing for clarity.)

The cage 78 has an inlet end 86 and an outlet end 88 corresponding to the normal forward direction of fluid flow through the assembly 60. The present example of FIG. 3 is for a forward flow from right to left as indicated by the arrow 90, and the subassemblies 62,64 are oriented as shown and described herein. In an alternative arrangement (not shown) the flow could be from left to right and the subassemblies would then be oriented in the opposite direction in the body 66.

A passage 92 extends through the cage 78 between the inlet and outlet ends. The passage has an axis 94 coinciding with that of the bore 82, and has a retaining section 96 adjacent the inlet end 86 loosely containing a ball 98. The ball is preferably made of a ceramic such as sintered alumina or sapphire. Space between the ball and the cage passage wall is within normal ceramic tolerances and is not critical, being conventional for check valves so as to retain the ball approximately on the axis, while allowing freedom for some axial displacement. Excessive clearance should be avoided. The retaining section may be simply a cylindrical section large enough to provide space for fluid to flow around the ball. Preferably, only enough space is allowed for free axial movement of the ball, and, an orthogonal pair of radial slots or the like are added for fluid flow around the ball.

The passage further has an irregular cross-section 104 adjacent the retaining section 96 and extending to the outlet end 88. This irregular section is designed to act as a ball stop to obstruct the ball in the normal flow direction without hindering forward fluid flow through the passage. Ball travel is accurately controlled by controlling the tolerance between the ball stop and the seat. A central portion 106 of the section 104 has a diameter less than the diameter of the ball 98. A slot 107 centered on the hole has a transverse length roughly the same as the diameter of the ball. Thus the ball is retained while fluid can pass in its normal direction through the passage.

The inlet end 86 of the cage is sealed to the body by means of a resilient, corrosion resistant, sealing member 108 in the shape of a thick washer press fitted into the bore against the inlet end of the cage. According to an embodiment of the invention, the seal is sufficiently fluid under pressure, and the seal volume is larger that the cavity volume, to insure that the seal material and cage are preloaded in compression. The resilient seal also must be viscous enough not to leak through clearances. The pressed fit places the ceramic cage in compression. A suitable material for the seal is a resilient, slightly flexible form of fluorocarbon polymer, particularly polytetrafluoroethylene (PTFE). The sealing member 108 has a central aperture 110 with a washer-shaped seat member 112 fitted therein. With the sealing member in compression in the bore, the sealing member 108 is squeezed around the seat member 112 to affix the latter within the bore 82 sealed in a positioned relationship with the inlet end 86 of the cage 78. The excess volume of seal material is preferably between about 2% and 20% of the cavity volume that the seal is intended to fill.

The seat 112 has an axial hole 114 with a small bevel 116 conventionally cooperative with the ball 98 to effect closure to fluid flow under reverse fluid pressure from the outlet end. Sufficient but minimum distance is left between the seat 112 and the ball stop 104 to allow fluid flow in the normal direction 90 when the valve is open. The seat 112 is preferably formed of ceramic such as sintered alumina or sapphire.

The outlet end 88 of the cage 78 is sealed to the body 66 with a further resilient washer-shaped sealing member 118 press fitted into the bore 82 against the outlet end of the cage. This member is desirably be formed of the same material as the inlet-end sealing member. The outlet-end member contacts the shoulder 70 so as to position the cage axially in the bore, with the reduced diameter portion 72 of the bore extending away from the cage.

According to a preferred embodiment of the present invention each cage 78,80 is provided with at least one lateral bleed hole 120 therein between the passage 92 and the outside of the cage, i.e. to the clearance space 84 between the cage and the body 76. This hole should be quite small, such as 0.25 mm. Fluid under pressure in the cage is forced through the hole into the clearance, where it and remanent gas in the clearance space equalize pressure inside and outside of the cage. This eliminates tensile load on the cage wall which is weak in tension and strong in compression. Any space resulting from irregularity of contact area against the body is filled in by pressurized fluid, particularly during initial pressurization so that the ceramic cage material will not fracture under the inside pressure that, alone, could cause fracture of the thin, brittle material.

The minute amount of possible backflow of fluid from the clearance space through the bleed hole back into the passage should generally be so insufficient as to be of no consequence.

However, if desired, as illustrated for the second cage 80, a checking means, such as a small check valve ball 122 could be inserted into an enlarged portion 124 of the bleed hole adjacent the body 66, to resist fluid flow from the clearance to the passage. A spring 126 would retain the small ball on its seat 128 except when the pressure builds up in the main valve assembly. Contamination of a subsequent fluid may thereby be minimized further.

Other means may be used for equalizing pressure. The cage could be made from porous ceramic or, alternatively, the body may have a bleed channel therein between the bore portion 72 and the clearance 84.

Figure 4:
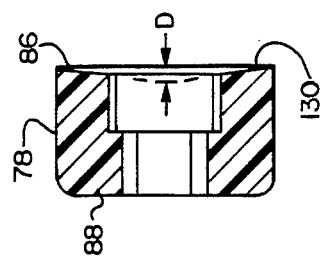
FIG. 4 is an embodiment for a cage component of FIG. 3.

Each sealing member has a contacting surface with a corresponding surface of the cage. The contacting surface of the sealing member should be substantially flat and perpendicular to the axis. It further has been discovered that the ends 86,88 of the cage should have corresponding surfaces that are at least flat or, preferably, slightly concave. This requirement is especially desirable for the inlet end 86, to ensure sealing when the ball is closed under back-pressure. A convex shape to the corresponding surface, such as may occur as a variance during fabrication, has been discovered to result in leakage between the ball and seat due to high spots on the cage distorting the seat. The concave surface 130 may be a very shallow spherical or conical section with a depth D (shown exaggerated in FIG. 4), defined by an extrapolation of the surface to the axis, for example of up to 5% of the diameter of the cage.

As indicated above a second subassembly 64 preferably is placed in tandem with the first subassembly 62 in the body 76, to improve reliability as in the conventional check valve system of FIG.2. The second subassembly has components advantageously the same as the first, namely a second cage 80, a second ball 134, a second seating member 136 and a second inlet-end sealing member 138. The first inlet-end sealing member 108, of the first subassembly 62, functions also as an outlet-end sealing member for the second cage 132. The second inlet-end sealing member is at the end 140 of the bore 76.

With the oversized seal, total volume taken up by the subassemblies 62,64 in the bore 76 should be sufficiently oversized upon initial assembly so that the press fit results in the second inlet-end sealing member 138 retaining the other components in compression in the bore. The press fit is effected by torquing the body with the other components inserted therein into a block (similar to the mounting block 77 shown in FIG. 3) with a flat bottom having a small central hole. Excess material from the member will flow laterally and leave a bulge 142, and the ceramic is preloaded in compression. The bulge also provides a seal to the mounting block 77, eliminating any requirement for a separate O-ring.

A check valve assembly of the present invention is particularly suitable in small size, in applications where a ceramic cage is desirable to resist corrosive fluids. Such a cage must be relatively small (thin walled) and, therefore, of insufficient tensile yield strength by itself to withstand the fluid pressure. Even with the body for support, there is to be some expected uneven contact in the bore inherently resulting from normal fabrication procedures, sufficient support is not provided without the fluid pressure equalization achieved with the bleed hole. An example is a check valve assembly of the type shown in FIG. 3 having a cage with a minimum wall thickness of 2 mm for a ball diameter of 8 mm which tested satisfactorily against 816 atmospheres (12,000 psi) fluid pressure. One application is in the pumping system for liquid chromatography, with conventional corrosive solvent liquids such as tetrahydrafluran or sodium hydroxide.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A high pressure check valve assembly useful for corrosive fluids under high pressure, comprising:
    a body having a cylindrical bore therethrough;
    a ball;
    a ceramic cage loosely fitted into the bore so as to leave at least a partial clearance between the cage and the body, the cage having an inlet end, an outlet end and a passage therebetween receptive of fluid at the inlet end, the passage having a retaining section adjacent the inlet end for loosely containing the ball and further having obstruction means therein adjacent the retaining section to obstruct the ball without hindering fluid flow forwardly through the passage;
    a washer-shaped seat member affixed within the bore adjacent to and in sealed relationship with the inlet end, the seat member being cooperative with the ball to effect closure under fluid pressure from the outlet end;
    inlet-end sealing means for sealing the inlet end of the cage to the body; and
    outlet-end sealing means for sealing the outlet end of the cage to the body.

2. The assembly according to claim 1 further comprising equalizing means for introducing fluid into the clearance so as to equalize fluid pressure between the passage and the clearance.

3. The assembly according to claim 2 wherein the equalizing means comprises the cage having a bleed hole therein between the passage and the clearance.

4. The assembly according to claim 3 further comprising a check means in the bleed hole to resist fluid flow from the clearance to the passage.

5. The assembly according to claim 1 wherein the obstruction means comprises the passage having an irregular cross section adjacent the retaining section.

6. The assembly according to claim 1 wherein the ball and the seat member are each formed of ceramic.

7. The assembly according to claim 1 wherein the inlet-end sealing means comprises a resilient washer-shaped inlet-end sealing member press fitted into the bore against the inlet end of the cage, the inlet-end sealing member having a central aperture with the seat member fitted therein to affix the seat member within the bore in the sealed relationship with the inlet end.

8. The assembly according to claim 7 wherein the outlet-end sealing means comprises a resilient washer-shaped outlet-end sealing member press fitted into the bore against the outlet end of the cage.

9. The assembly to claim 8 wherein a space in the bore containing the sealing member is defined by the body, the seat member and the cage, and the inlet-end sealing member has a volume greater than the space.

10. The assembly according to claim 9 wherein the sealing member is retained in compression in the space, has sufficient fluidity to preload the ceramic cage in compression, and has sufficient viscosity not to extrude through the clearance.

11. The assembly according to claim 8 wherein the inlet-end and outlet-end sealing members are formed of a resilient fluorocarbon polymer.

12. The assembly according to claim 8 wherein the bore has a shoulder therein to reduce bore diameter away from the cage, and the outlet-end seating member contacts the shoulder so as to position the cage axially in the bore.

13. The assembly according to claim 8 wherein the inlet-end and outlet-end sealing members each has an axis and a contacting surface with a corresponding surface of the cage at the inlet or outlet end, each contacting surface being substantially flat and perpendicular to the axis prior to complete press fitting in the assembly, and the corresponding surfaces of the cage each being flat or slightly concave.

14. The assembly according to claim 13 wherein the corresponding surface of the inlet end of the cage is slightly concave.

15. The assembly according to claim 8 wherein the cage, the ball, the seat member and the inlet-end sealing member collectively constitute a first subassembly, and the assembly further comprises a second cage, a second ball, a second seating member and a second inlet-end sealing member collectively constituting a second subassembly, the second subassembly being substantially the same as the first subassembly and similarly disposed in the bore with the second cage sealingly pressed against the first inlet-end sealing member.

16. The assembly according to claim 15 wherein the bore has a shoulder therein to reduce bore diameter away from the cage, the outlet-end seating member contacts the shoulder so as to position the cage axially in the bore, and the second inlet sealing member is press fitted in the bore so as to retain the first and second subassemblies in the bore.

* * * * *